United States Patent
Ishida et al.

(10) Patent No.: US 9,416,304 B2
(45) Date of Patent: Aug. 16, 2016

(54) CUBIC BORON NITRIDE COMPLEX POLYCRYSTAL AND MANUFACTURING METHOD THEREFOR, AND CUTTING TOOL, WIRE-DRAWING DIE AND GRINDING TOOL

(75) Inventors: Yuh Ishida, Itami (JP); Hitoshi Sumiya, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 178 days.

(21) Appl. No.: 14/241,362

(22) PCT Filed: Aug. 24, 2012

(86) PCT No.: PCT/JP2012/071428
§ 371 (c)(1),
(2), (4) Date: Feb. 26, 2014

(87) PCT Pub. No.: WO2013/031681
PCT Pub. Date: Mar. 7, 2013

(65) Prior Publication Data
US 2015/0000207 A1   Jan. 1, 2015

(30) Foreign Application Priority Data

Aug. 30, 2011  (JP) ................. 2011-187450
Aug. 30, 2011  (JP) ................. 2011-187451

(51) Int. Cl.
*C09K 3/14* (2006.01)
*C04B 35/5831* (2006.01)
*C04B 35/645* (2006.01)

(52) U.S. Cl.
CPC ........... *C09K 3/1418* (2013.01); *C04B 35/5831* (2013.01); *C04B 35/6455* (2013.01);
(Continued)

(58) Field of Classification Search
CPC .............. B24D 3/00; B24D 3/06; B24D 5/00; B24D 7/00; B24D 18/00; C09K 3/14; B22F 3/00; C01B 21/06
See application file for complete search history.

(56) References Cited

U.S. PATENT DOCUMENTS 3,212,851 A   10/1965  Bundy et al.
3,212,852 A   10/1965  Bundy et al.
(Continued)

FOREIGN PATENT DOCUMENTS

FR    2 508 429 A1   12/1982
GB    2058840 A       4/1981
(Continued)

OTHER PUBLICATIONS

Taniguchi et al. JP 2008-0191164 A (2008) Machine Translation. Accessed Dec. 4, 2015.*
(Continued)

*Primary Examiner* — Pegah Parvini
*Assistant Examiner* — Alexandra M Moore
(74) *Attorney, Agent, or Firm* — Venable LLP; Michael A. Sartori; David M. Klecyngier

(57) ABSTRACT

A cubic boron nitride complex polycrystal contains granular cubic boron nitride and tabular cubic boron nitride. The average grain size of the granular cubic boron nitride is 500 nm or less. The maximum value of a short side of the tabular cubic boron nitride is 10 nm or more to 10000 nm or less. Thereby, it is possible to provide a cubic boron nitride complex polycrystal having high hardness and a manufacturing method therefor, a cutting tool, a wire-drawing die and a grinding tool including the same.

11 Claims, 1 Drawing Sheet

(52) U.S. Cl.
CPC ..... *C04B2235/5292* (2013.01); *C04B 2235/72* (2013.01); *C04B 2235/767* (2013.01); *C04B 2235/781* (2013.01); *C04B 2235/788* (2013.01); *C04B 2235/96* (2013.01)

(56) References Cited

U.S. PATENT DOCUMENTS

| | | |
|---|---|---|
| 4,188,194 A | 2/1980 | Corrigan |
| 4,361,543 A | 11/1982 | Zhdanovich et al. |
| 5,108,966 A | 4/1992 | Holt et al. |
| 6,737,377 B1 | 5/2004 | Sumiya et al. |

FOREIGN PATENT DOCUMENTS

| | | |
|---|---|---|
| JP | 41-13731 B1 | 8/1966 |
| JP | 47-34099 | 11/1972 |
| JP | 49-27518 | 7/1974 |
| JP | 49-125412 A | 11/1974 |
| JP | 63-394 | 1/1988 |
| JP | 3-159964 A | 7/1991 |
| JP | 08-47801 A | 2/1996 |
| JP | 11-246271 A | 9/1999 |
| JP | 2000-042807 A | 2/2000 |
| JP | 2008-019164 A | 1/2008 |

OTHER PUBLICATIONS

Notification of Third Office Action in Chinese Patent Application No. 2012800411915, dated Sep. 24, 2015.
Xiaohu et al., "Science and Technology of Superhard Material", vol. 1, China Building Materials Industry Press, Apr. 1998, pp. 336.
Zhiying Wu, "Synthesis process of hBN and the influence on its characteristics," Abrasive, Abrasive Tool and Grinding, pp. 34-37, Dec. 31, 1992.
Notification of Second Office Action in Chinese Patent Application No. 2012800411915, dated Apr. 13, 2015.
Partial Supplementary European Search Report in European Patent Application No. 12828205.0, dated Apr. 24, 2015.
International Search Report in PCT International Application No. PCT/JP2012/071428, dated Oct. 9, 2012.
Extended European Search Report in European Patent Application No. 15173815.0, dated Sep. 17, 2015.

* cited by examiner

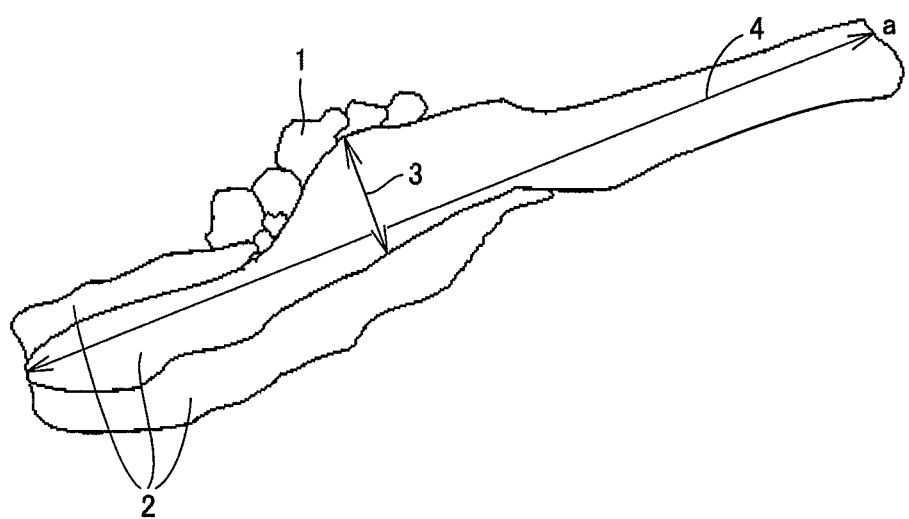

CUBIC BORON NITRIDE COMPLEX POLYCRYSTAL AND MANUFACTURING METHOD THEREFOR, AND CUTTING TOOL, WIRE-DRAWING DIE AND GRINDING TOOL

TECHNICAL FIELD

An aspect of the present invention relates to cubic boron nitride complex polycrystal and a manufacturing method therefor, and a cutting tool, a wire-drawing die and a grinding tool, and in particular, relates to cubic boron nitride complex polycrystal useful in a cutting tool and a wear-resistant tool for a ferrous material, a cutting tool, a wire-drawing die and a grinding tool including the polycrystal.

Another aspect of the present invention relates to cubic boron nitride complex polycrystal containing wurtzite-type boron nitride (wBN) and cubic boron nitride (cBN) and a manufacturing method therefor, and a cutting tool, a wire-drawing die and a grinding tool, and in particular, relates to cubic boron nitride complex polycrystal useful in cutting a ferrous material, a cutting tool, a wire-drawing die and a grinding tool including the polycrystal.

BACKGROUND ART

Conventionally, a cubic boron nitride (cBN) sinter used as a cutting tool or a wear-resistant tool contains therein a sintering agent or a binding agent such as TiN, TiC and Co. The sinter is obtained by sintering cBN powder with the sintering agent or the binding agent at a pressure of about 4 to 5 GPa. The sinter contains therein the binding agent at about 10 to 40%. The binding agent greatly affects the strength, the heat resistance and the heat diffusion of the sinter, and especially in cutting a ferrous material, defects and cracks are likely to occur on the cutting edge, which shortens the lifetime of the tool.

As an approach to prolong the lifetime of the tool, there is known a manufacturing method for a cBN sinter without using a binding agent. In the method, hexagonal boron nitride (hBN) and a catalyst such as boron nitride magnesium are used as a starting material, and they are sintered and reacted. According to the method, since no binding agent is used, the cBN individuals bind to each other strongly and the thermal conductivity becomes as high as 6 to 7 W/cm° C. Thus, the cBN sinter is used as a heat sink material or in a TAB (Tape Automated Bonding) tool or the like. However, since a certain portion of the catalyst will remain in the sinter, and when the sinter is heated, due to the thermal expansion difference between cBN and the catalyst, it is easy for fine cracks to occur. Thereby, the heat-resistant temperature is as low as about 700° C., which would be a big problem for a cutting tool. Further, since the grain size is roughly as large as 10 μm, it improves the thermal conductivity but weakens the strength thereof, making it intolerable to a large cutting load.

In general, the cBN sinter used as a cutting tool is manufactured by sintering cBN powder with a binding agent such as TiN, TiC and Co at a pressure of about 4 to 5 GPa. The manufactured sinter contains therein the binding agent at about 10 to 40%, and the binding agent deteriorates the strength, the heat resistance and the heat diffusion of the sinter. Thereby, in high-speed cutting, and especially in cutting a ferrous material, defects and cracks are likely to occur on the cutting edge, which shortens the lifetime of the tool.

As an approach to solve this problem, there is known a manufacturing method for a cBN sinter without using a binding agent. In the method, hexagonal boron nitride (hBN) and a catalyst such as boron nitride magnesium are used as a starting material, and they are sintered and reacted. According to the method, since no binding agent is used, the cBN individuals bind to each other strongly and the thermal conductivity becomes as high as 6 to 7 W/cm° C. Thus, the cBN sinter is used in as a heat sink material or in a TAB (Tape Automated Bonding) tool or the like. However, since a certain portion of the catalyst will remain in the sinter, and when the sinter is heated, due to the thermal expansion difference between cBN and the catalyst, it is easy for fine cracks to occur. Thereby, the heat-resistant temperature is as low as about 700° C., which would be a big problem for a cutting tool. Further, since the grain size is roughly as large as 10 μm, it improves the thermal conductivity but weakens the strength thereof, making it intolerable to a large cutting load.

On the other hand, the cBN sinter can also be obtained through direct conversion by sintering an atmospheric BN such as hBN at ultra-high pressure and temperature. For example, such method of obtaining a cBN sinter by converting hBN to cBN at ultra-high pressure and temperature is disclosed in Japanese Patent Laying-Open No. 47-34099 (PTD 1) and Japanese Patent Laying-Open No. 3-159964 (PTD 2).

Further, there is a method of using pyrolytic boron nitride (pBN) as a starting material to obtain a cBN sinter, which is for example disclosed in Japanese Patent Publication No. 63-394 (PTD 3) and Japanese Patent Laying-Open No. 8-47801 (PTD 4). However, in this method, strict conditions of 7 GPa and 2100° C. or more are required.

Another method of obtaining a cBN sinter at a pressure of 6 GPa and a temperature of 1100° C. which are relatively mild in comparison to the above conditions is disclosed in Japanese Patent Publication No. 49-27518 (PTD 5). In this method, since the grains of hBN serving as the raw material is 3 μm or less, hBN contains boron oxide impurities and adsorption gas at several percentage. Due to the influence of the impurities and the adsorption gas, the sintering will proceed insufficiently or the hardness will decrease due to the presence of oxides, which makes it impossible to be used as a cutting tool and a wear-resistant tool.

In order to solve the above problems, Japanese Patent Laying-Open No. 11-246271 (PTD 6) discloses a method of using low crystalline hexagonal boron nitride as a starting material to synthesize a cBN sinter at 6 to 7 GPa and 1550 to 2100° C.

CITATION LIST

Patent Document

PTD 1: Japanese Patent Laying-Open No. 47-34099
PTD 2: Japanese Patent Laying-Open No. 3-159964
PTD 3: Japanese Patent Publication No. 63-394
PTD 4: Japanese Patent Laying-Open No. 8-47801
PTD 5: Japanese Patent Publication No. 49-27518
PTD 6: Japanese Patent Laying-Open No. 11-246271

SUMMARY OF INVENTION

Technical Problem

However, the cBN polycrystal synthesized by this method has a grain size of 500 nm, which makes it unsuitable for a cutting tool or a wear-resistant tool in microfabrication applications. On the other hand, if the grain size of the cBN polycrystal is made smaller through temperature control, the cBN polycrystal may be used in microfabrication applications. However, reducing the grain size will facilitate the development of cracks and lower the toughness, which makes it difficult to tolerate a high load processing.

In view of one problem mentioned above, an object according to an aspect of the present invention is to provide cubic boron nitride complex polycrystal having high hardness and a manufacturing method therefor, and a cutting tool, a wire-drawing die and a grinding tool including the polycrystal.

The cBN polycrystal synthesized by the method in Japanese Patent Laying-Open No. 11-246271 has an average grain size as large as 500 nm, which makes it unsuitable for a cutting tool in microfabrication and ultra-precision machining applications.

In view of another problem mentioned above, an object according to another aspect of the present invention is to provide cubic boron nitride complex polycrystal having high hardness and a small average grain size and a manufacturing method therefor, and a cutting tool, a wire-drawing die and a grinding tool including the polycrystal.

Solution to Problem

In order to solve the abovementioned problems, after intensive researching, the inventors of the present invention found that while hexagonal boron nitride is being directly converted to cubic boron nitride at ultra-high pressure and temperature, if cubic boron nitride having relatively coarse and tabular grains stacked in layers is dispersed between fine grains of granular cubic boron nitride, it is possible to obtain cubic boron nitride complex polycrystal which is extremely hard and tough, and effective in inhibiting the development of fine cracks.

A cubic boron nitride complex polycrystal according to one aspect of the present invention includes a complex structure of granular cubic boron nitride and tabular cubic boron nitride. The average grain size of the granular cubic boron nitride is 500 nm or less. The maximum value of a short side of the tabular cubic boron nitride is 10 nm or more to 10000 nm or less. Here, "tabular" means having a planar shape longer in one direction. More specifically, "tabular" means having a shape in which the length in the longer direction (i.e., the length of a long side) is at least 3 times greater than the length in the shorter direction (i.e., the length of a short side). Here, "short side" means the length of a crystal substantially orthogonal to the longer direction.

Preferably, in the cubic boron nitride complex polycrystal, the average grain size of the granular cubic boron nitride is 300 nm or less.

Preferably, in the cubic boron nitride complex polycrystal, the maximum value of the short side of the tabular cubic boron nitride is 10 nm or more to 1000 nm or less.

Preferably, the cubic boron nitride complex polycrystal further contains wurtzite-type boron nitride and unavoidable impurities as the remainder and the content of the wurtzite-type boron nitride is 0.1 to 95 v/v %.

Preferably, the cubic boron nitride complex polycrystal further contains wurtzite-type boron nitride and unavoidable impurities as the remainder and the content of the wurtzite-type boron nitride is 0.1 to 10 v/v %.

Preferably, in the cubic boron nitride complex polycrystal, the average grain size of the granular cubic boron nitride is 200 nm or less.

Preferably, the cubic boron nitride complex polycrystal further contains wurtzite-type boron nitride, pressurized hexagonal boron nitride and unavoidable impurities as the remainder, the content of the wurtzite-type boron nitride is 0.1 to 3 v/v %, and the content of the pressurized hexagonal boron nitride is 0.01 to 0.5 v/v %.

A manufacturing method for cubic boron nitride complex polycrystal according to one aspect of the present invention includes the steps of preparing atmospheric boron nitride as a starting material and sintering the atmospheric boron nitride concurrently as it is being converted to cubic boron nitride directly. The sintering step is performed under conditions of a pressure of 8 GPa or more and a temperature of 1300 to 2200° C.

It should be noted that it is not necessary to convert all of the hexagonal boron nitride to the cubic boron nitride. For example, a part of the hexagonal boron nitride may be converted to the cubic boron nitride, and the remaining part thereof may be converted to the wurtzite-type boron nitride or the pressurized hexagonal boron nitride.

Preferably, the manufacturing method mentioned above includes the steps of preparing hexagonal boron nitride as a starting material and sintering the hexagonal boron nitride concurrently as it is being converted to the cubic boron nitride directly. The sintering step is performed under conditions of a pressure of 8 GPa or more and a temperature of 1600 to 2100° C.

Preferably, in the manufacturing method, a graphitization index of the starting material determined by the X-ray diffraction method is less than 5.

A cutting tool according to one aspect of the present invention includes the cubic boron nitride complex polycrystal mentioned above.

A wire-drawing die according to one aspect of the present invention includes the cubic boron nitride complex polycrystal mentioned above.

A grinding tool according to one aspect of the present invention includes the cubic boron nitride complex polycrystal mentioned above.

In order to solve the abovementioned problems, after intensive researching, the inventors of the present invention found that it is possible to obtain the cubic boron nitride complex polycrystal, which contains the wurtzite-type boron nitride at 10 to 95 v/v %, and cubic boron nitride and unavoidable impurities as the remainder, and has an average grain size of 200 nm or less and high hardness, through direct conversion of atmospheric boron nitride to the cubic boron nitride and the wurtzite-type boron nitride under conditions of a pressure of 11 GPa or more and a temperature of less than 2100° C.

A cubic boron nitride complex polycrystal according to another aspect of the present invention contains the wurtzite-type boron nitride at 10 to 95 v/v %, and the cubic boron nitride and unavoidable impurities as the remainder. The average grain size of the cubic boron nitride is 200 nm or less. Here, the unavoidable impurities includes, for example, nitrogen, hydrogen, oxygen and the like.

Preferably, in the cubic boron nitride complex polycrystal, the content of the wurtzite-type boron nitride is greater than the content of the cubic boron nitride.

Preferably, in the cubic boron nitride complex polycrystal, the Knoop hardness thereof is 50 GPa or more.

A manufacturing method for cubic boron nitride complex polycrystal according to another aspect of the present invention includes the steps of preparing atmospheric boron nitride as a starting material and sintering the atmospheric boron nitride concurrently as it is being converted to cubic boron nitride and wurtzite-type boron nitride directly. The sintering step is performed under conditions of a pressure of 11 GPa or more and a temperature of less than 2100° C.

Preferably, in the manufacturing method mentioned above, the starting material is hexagonal boron nitride having a graphitization index determined by the X-ray diffraction method of less than 5.

A cutting tool according to another aspect of the present invention includes the cubic boron nitride complex polycrystal mentioned above.

A wire-drawing die according to another aspect of the present invention includes the cubic boron nitride complex polycrystal mentioned above.

A grinding tool according to another aspect of the present invention includes the cubic boron nitride complex polycrystal mentioned above.

Advantageous Effects of Invention

According to one aspect of the present invention, it is possible to manufacture a cubic boron nitride complex polycrystal having high hardness. Moreover, according to one aspect of the present invention, it is possible to obtain a cutting tool, a wire-drawing die and a grinding tool having excellent hardness.

According to another aspect of the present invention, it is possible to manufacture a cubic boron nitride complex polycrystal having a small average grain size and high hardness. Moreover, according to another aspect of the present invention, it is possible to obtain a cutting tool, a wire-drawing die and a grinding tool which include therein the polycrystal and have excellent characteristics.

BRIEF DESCRIPTION OF DRAWINGS

FIG. 1 is a view schematically illustrating an example of a complex structure of granular cubic boron nitride and tabular cubic boron nitride according to Embodiment 1 of the present invention.

DESCRIPTION OF EMBODIMENTS

Embodiment 1

Hereinafter, embodiments of the present invention will be described with reference to FIG. 1.

As illustrated in FIG. 1, cubic boron nitride complex polycrystal according to the present embodiment contains granular cubic boron nitride 1 and tabular cubic boron nitride 2. The cubic boron nitride complex polycrystal according to the present embodiment does not contain any sintering agent or catalyst, and is formed substantially from high-pressure phase boron nitride only.

Cubic boron nitride 2 may be present in the cubic boron nitride complex polycrystal as a singular tabular crystal plate, and as illustrated in FIG. 1, a plurality of tabular cubic nitride 2 may be present in the cubic boron nitride complex polycrystal as being lined up in layers. On the other hand, granular cubic boron nitride 1 is exemplified in FIG. 1 as grains lined up along the periphery of tabular cubic boron nitride 2 and the grains may have a grain size smaller than a short side 3 of tabular cubic boron nitride 2 extending in a longer direction a. As illustrated in FIG. 1, a plurality of granular cubic boron nitride 1 is present as being lined up along the periphery of tabular cubic boron nitride 2.

As mentioned above, since the large and elongated tabular cubic boron nitride 2 is present in a plurality of small granular cubic boron nitride 1, it is possible to inhibit plastic deformation or the development of cracks. Thus, the cubic boron nitride complex polycrystal according to the present embodiment has high hardness. In other words, the cubic boron nitride complex polycrystal according to the present embodiment is very tough and exhibits high hardness characteristics. Thereby, the cubic boron nitride complex polycrystal according to the present embodiment can be used as a cutting tool and a wear-resistant tool requiring high hardness.

The average grain size of granular cubic boron nitride 1 is about 500 nm or less. Preferably, the average grain size of granular cubic boron nitride 1 is about 300 nm or less. It was confirmed by each example to be described hereinafter that it is possible to obtain the cubic boron nitride complex polycrystal having the Knoop hardness of 50 GPa or more if the average grain size of granular cubic boron nitride 1 is controlled at about 93 nm to 210 nm. However, it is conceivable that the same effect can be obtained if the average grain size of granular cubic boron nitride 1 is controlled at about 500 nm or less.

More preferably, the average grain size of granular cubic boron nitride 1 is about 100 nm or less. With reference to each example to be described hereinafter, it is conceivable that it is possible to obtain the cubic boron nitride complex polycrystal having the Knoop hardness of 55 GPa or more if the average grain size of granular cubic boron nitride 1 is controlled at about 100 nm or less.

The maximum value of short side 3 of tabular cubic boron nitride 2 is 10 nm or more to 10000 nm or less. Preferably, the maximum value of short side 3 of tabular cubic boron nitride 2 is 10 nm or more to 1000 nm or less. If the maximum value of short side 3 is too small (less than 10 nm, for example), the effect of inhibiting the plastic deformation or the development of cracks will decrease. On the other hand, if the maximum value of short side 3 is too large (larger than 10000 nm, for example), the influence resulted from the plastic deformation or cleavage (transgranular fracture) of tabular cubic boron nitride 2 itself will increase, which thereby decreases the hardness and the strength of the cubic boron nitride complex polycrystal.

It was confirmed by each example to be described hereinafter that it is possible to obtain the cubic boron nitride complex polycrystal having the Knoop hardness of 50 GPa or more if the maximum value of short side 3 of tabular cubic boron nitride 2 is controlled at about 552 nm or more to 1103 nm or less. However, it is conceivable that the same effect can be obtained if the maximum value of short side 3 of tabular cubic boron nitride 2 is controlled at about 10 nm to 10000 nm.

Preferably, the cubic boron nitride complex polycrystal further contains wurtzite-type boron nitride and unavoidable impurities as the remainder. The content of the wurtzite-type boron nitride is 0.1 to 10 v/v %, for example. Here, it is preferred that the average grain size of granular cubic boron nitride 1 is 200 nm or less. The unavoidable impurities may be, for example, nitrogen, hydrogen, oxygen and the like.

It was confirmed by each example to be described hereinafter that it is possible to obtain the cubic boron nitride complex polycrystal having the Knoop hardness of 50 GPa or more if the content of the wurtzite-type boron nitride is about 0.83 to 7.5 v/v % and the average grain size of granular cubic boron nitride 1 is about 93 nm to 190 nm. However, it is conceivable that the same effect can be obtained if the content of the wurtzite-type boron nitride is about 0.1 to 10 v/v % and the average grain size of granular cubic boron nitride 1 is about 200 nm or less.

Preferably, the cubic boron nitride complex polycrystal further contains the wurtzite-type boron nitride, pressurized hexagonal boron nitride and unavoidable impurities as the remainder. Here, the content of the wurtzite-type boron nitride is 0.1 to 3 v/v %, for example, and the content of the pressurized hexagonal boron nitride is 0.01 to 0.5 v/v %, for example. The unavoidable impurities may be, for example, nitrogen, hydrogen, oxygen and the like.

It was confirmed by each example to be described hereinafter that it is possible to obtain the cubic boron nitride complex polycrystal having the Knoop hardness of 50 GPa or more if the content of the wurtzite-type boron nitride is about 0.83 to 0.95 v/v % and the content of the pressurized hexagonal boron nitride is about 0.21 to 0.24 v/v %. However, it is conceivable that the same effect can be obtained if the content of the wurtzite-type boron nitride is about 0.1 to 3 v/v % and the content of the pressurized hexagonal boron nitride is about 0.01 to 0.5 v/v %.

The cubic boron nitride complex polycrystal according to the present embodiment can be used in a cutting tool, a wire-drawing die, a grinding tool and the like. More specifically, it can be used as a material for precision tools such as a cutting tool bit, a die and a micro tool.

Hereinafter, a manufacturing method for the cubic boron nitride complex polycrystal according to the present embodiment will be described.

First, hexagonal boron nitride (hBN) is prepared as a starting material. It is preferred that the hexagonal boron nitride has a high crystallinity. Here, the high crystallinity of the raw material means that a graphitization index (GI index) determined by the X-ray diffraction method is less than 5. The GI index is derived by introducing three X-ray diffraction peaks of hBN, that is, areas of the peaks (100), (101) and (102) into Equation 1.

$$GI=(I_{(100)}+I_{(101)})/I_{(102)}$$

Equation 1

As the crystallinity of hBN increases, the GI index will decrease. Here, I(XXX) indicates an area of a diffraction peak in a (XXX) plane of the hBN crystal.

Thereafter, the hBN raw material with a high crystallinity is sintered concurrently as the hexagonal boron nitride is being converted to the cubic boron nitride by using a super HPHT generating device. The sintering is carried out under conditions of a pressure of 8 GPa or more and a temperature of 1600 to 2200° C., and is kept at a pressure where cBN is thermodynamically stable for a predetermined time. More preferably, the sintering pressure is 10 GPa or more and the sintering temperature is 1600 to 2100° C. Further preferably, the sintering pressure is 10 GPa or more to 16.5 GPa or less and the sintering temperature is 1600 to 2100° C. In the present embodiment, hBN is converted to a high-pressure phase BN directly at a super high pressure and a super high temperature without the addition of a sintering agent or a catalyst and sintered thereafter.

In the manufacturing method of the present embodiment, it is unnecessary to convert all of the hexagonal boron nitride to the cubic boron nitride. For example, a part of the hexagonal boron nitride may be converted to the cubic boron nitride, and the remaining part may be converted to the wurtzite-type boron nitride or the pressurized hexagonal boron nitride.

The important factor in manufacturing the cBN polycrystal of high hardness according to the present invention is that the sintering temperature should not be raised too high. If the temperature is too high (for example, 2200° C. or more), fine-grain cBN crystals will grow in grain size and the tabular cBN will lose its euhedral shape. Therefore, it is necessary to lower the temperature. The temperature which inhibits the grain growth of cBN crystals and reserves the tabular cBN will be different depending on the pressure.

According to the manufacturing method for the cubic boron nitride complex polycrystal according to the present embodiment, it is possible to obtain the cubic boron nitride complex polycrystal which contains granular cubic boron nitride 1 and tabular cubic boron nitride 2, the average grain size of granular cubic boron nitride 1 is 500 nm or less, and the maximum value of short side 3 of tabular cubic boron nitride 2 is 10 nm or more to 10000 nm or less. Further, according to the manufacturing method of present embodiment, it is possible to obtain the above cubic boron nitride complex polycrystal stably and cheaply. Furthermore, according to the manufacturing method of the present embodiment, it is possible to reduce characteristic variations caused by the reagents.

Embodiment 2

Hereinafter, the present embodiment will be described.

The cubic boron nitride complex polycrystal according to the present embodiment contains a plurality of cubic boron nitrides (cBN) and a plurality of wurtzite-type boron nitrides (wBN), and has a densed complex structure in which the cubic boron nitrides, the wurtzite-type boron nitrides, and the cubic boron nitrides and the wurtzite-type boron nitrides are bonded to each other firmly. Specifically, the polycrystal is constituted by the wurtzite-type boron nitride at about 10 to 95 v/v %, and the cubic boron nitride and unavoidable impurities as the remainder. In other words, the content of the wurtzite-type boron nitride is about 10 to 95 v/v %, and the content of the cubic boron nitride and unavoidable impurities is about 90 to 5 v/v %. The unavoidable impurities may be, for example, nitrogen, hydrogen, oxygen and the like. Here, the average grain size of the cubic boron nitride is about 200 nm or less. The polycrystal does not contain a binding agent, a sintering agent, a catalyst or the like substantially.

The cubic boron nitride complex polycrystal according to the present embodiment has a small average grain size and high hardness. It was confirmed by examples to be described hereinafter that the cubic boron nitride complex polycrystal, which contains the wurtzite-type boron nitride at a content of about 10.2 to 63 v/v %, and the cubic boron nitride and unavoidable impurities as the remainder, has an average grain size of about 53 nm to 166 nm and the Knoop hardness of about 50 to 57 GPa. However, it is conceivable that the same effect can be obtained if the content of the wurtzite-type boron nitride is about 10 to 95 v/v % and the remainder is the cubic boron nitride and unavoidable impurities. Further, the cubic boron nitride complex polycrystal according to the present embodiment is superior in strength, capable of inhibiting the development of cracks in the polycrystal, and superior in toughness.

Preferably, in the cubic boron nitride complex polycrystal, the content of the wurtzite-type boron nitride is greater than the content of the cubic boron nitride. It was confirmed by examples to be described hereinafter that it is possible to obtain the cubic boron nitride complex polycrystal having the Knoop hardness of about 57 GPa or more if the content of the wurtzite-type boron nitride is controlled at about 63% or more. However, it is conceivable that the cubic boron nitride having high hardness can be obtained as well if the content of the wurtzite-type boron nitride is made greater than the content of the cubic boron nitride.

The cubic boron nitride complex polycrystal according to the present embodiment can be used in a cutting tool, a wire-drawing die, a grinding tool and the like. More specifically, it can be used as a material for precision tools such as a cutting tool bit, a die and a micro tool.

Hereinafter, a manufacturing method for the cubic boron nitride complex polycrystal according to the present embodiment will be described.

The cubic boron nitride complex polycrystal according to the present embodiment may be obtained by appropriately controlling a binding force among cBN component grains and among wBN component grains, the grain size thereof, a generated amount of wBN and the like. For example, an atmospheric boron nitride having a high crystallinity is used in the starting material, and sintered within a temperature range where the grain growth hardly occurs.

Specifically, at first, hexagonal boron nitride (hBN), pyrolytic boron nitride (pBN) or the like is prepared as the starting material. It is preferred that the hexagonal boron nitride has a high crystallinity. Here, the high crystallinity of the raw material means that the graphitization index (GI index) determined by the X-ray diffraction method is less than 5. The GI index is derived by introducing three X-ray diffraction peaks of hBN, that is, the areas of peaks (100), (101) and (102) into Equation 1 described in Embodiment 1.

As the crystallinity of hBN increases, the GI index will decrease. Here, I(XXX) indicates an area of a diffraction peak in a (XXX) plane of the hBN crystal.

Thereafter, the starting material, namely the atmospheric boron nitride is sintered concurrently as it is being converted to the cubic boron nitride and the wurtzite-type boron nitride by using a super HPHT generating device. The sintering is carried out under conditions of a pressure of 11 GPa or more and a temperature lower than 2100° C., and is kept at a pressure where cBN is thermodynamically stable for a predetermined time. More preferably, the sintering pressure is 13 GPa or more and the sintering temperature is lower than 2100° C. Further preferably, the sintering pressure is 13 GPa or more and the sintering temperature is lower than 1600° C.

In manufacturing the cubic boron nitride complex polycrystal, the sintering temperature is particularly important. If the sintering temperature is too high (for example, 2100° C. or more), the generated amount of wBN will become extremely less, and if the sintering temperature is too low (for example, 1200° C. or less), too much unconverted hBN will remain. In addition, the sintering temperature appropriate for synthesizing the cBN polycrystal varies with pressure, and thereby, a high temperature is required when the pressure is low, and the synthesis can be carried out at a low temperature if the pressure is raised high. Moreover, the pressure and temperature conditions for synthesizing the cBN polycrystal vary depending on the crystallinity and the grain size of the starting material.

According to the manufacturing method of the present embodiment, it is possible to obtain the cubic boron nitride complex polycrystal which contains the wurtzite-type boron nitride at about 10 to 95 v/v %, and the cubic boron nitride and unavoidable impurities as the remainder, and the average grain size of the cubic boron nitride is about 200 nm or less. The Knoop hardness of the cubic boron nitride complex polycrystal is about 50 to 57 GPa under the condition where a test load is 49N. Such Knoop hardness is higher than the Knoop hardness of a cBN sinter obtained through the use of a sintering agent, and is also higher than the Knoop hardness of a cBN sinter which is synthesized to have a grain size of 500 nm at a pressure of 8 GPa without any binding agent.

It was confirmed by examples to be described hereinafter that it is possible to obtain the cubic boron nitride complex polycrystal which has an average grain size of about 53 nm to 166 nm and the Knoop hardness of about 50 to 57 GPa if the sintering conditions are set in such a way that the pressure is about 13 GPa or more to 20 GPa or less and the temperature is about 1300° C. or more to 1700° C. or less. However, it is conceivable that the cubic boron nitride complex polycrystal having the same characteristics can be obtained if the sintering conditions are set in such a way that the pressure is about 11 GPa or more and the temperature is less than 2100° C.

In the manufacturing method of the present embodiment, it is preferable that the starting material is hexagonal boron nitride (high crystalline hBN) having a graphitization index determined by the X-ray diffraction method of less than 5. It was confirmed by examples to be described hereinafter that it is possible to obtain the cubic boron nitride complex polycrystal which has an average grain size of about 101 nm to 166 nm and the Knoop hardness of about 53 to 57 GPa in the case where the starting material is hexagonal boron nitride having a graphitization index of less than 5. On the other hand, it was confirmed that it is possible to obtain the cubic boron nitride complex polycrystal which has the average grain size of about 53 to 87 nm and the Knoop hardness of about 50 to 51 GPa in the case where the starting material is pyrolytic boron nitride (pBN).

Hereinafter, examples of the present invention will be described.

(Experiment 1)

The cubic boron nitride complex polycrystal according to Examples 1 to 7 was prepared in the following manner. First, high crystalline hBN in the form of pellets, which is commercially available and has a GI index of 3.6, was used as the starting material. The starting material was placed in a capsule made of high-melting metal and held for 20 minutes under the pressure and temperature conditions listed in Table 1 by using a super HPHT generator to convert the starting material directly into cBN.

The cubic boron nitride complex polycrystal according to Comparative Examples 1 and 2 was prepared in the following manner. First, high crystalline hBN in the form of pellets, which is commercially available and has the GI index of 3.6, was used as the starting material. The starting material was placed in a capsule made of high-melting metal and held at a temperature of 2300° C. for 20 minutes under a pressure of 7.7 GPa generated by using a belt-type high pressure generator to convert the starting material directly into cBN.

The cubic boron nitride complex polycrystal according to Comparative Example 3 was prepared in the following manner. First, high crystalline hBN in the form of pellets, which is commercially available and has the GI index of 3.6, was used as the starting material. The starting material was placed in a capsule made of high-melting metal and held at a temperature of 2300° C. for 20 minutes under a pressure of 10 GPa generated by using a belt-type high pressure generator to convert the starting material directly into cBN.

The cubic boron nitride complex polycrystal according to Comparative Example 4 was prepared in the following manner. First, pyrolytic boron nitride (pBN) was used as the starting material. The starting material was held for 20 minutes under the conditions of 10 GPa and 2100° C. by using a super HPHT generator to convert the starting material directly into cBN.

The composition, the grain size, and the hardness of each polycrystal obtained in the abovementioned manner in Examples 1 to 7 and Comparative Examples 1 to 4 were measured according to the following method.

The composition of each phase was obtained by identifying each phase through using an X-ray diffraction device (X'Pert manufactured by PANalytical). The X-ray source of the device is Cu, which emits a Kα beam having a wavelength of 1.54 Å.

The average grain size of the granular crystal (granular cubic boron nitride 1) was measured by using a scanning electron microscope (ULTRA55 manufactured by Carl Zeiss company). A section method was used to obtain the average grain size. In the method, firstly, a circle is drawn on an image of the scanning electron microscope (SEM), 8 straight lines are drawn radially from the center to the outer circumference The results about the composition, the grain size and the hardness of each polycrystal in Examples 1 to 7 and Comparative Examples 1 to 4 are shown in Table 1.

TABLE 1

| | | Synthetic Condition | | Composition | | | Structure | | Knoop |
| --- | --- | --- | --- | --- | --- | --- | --- | --- | --- |
| | | | | | | | maximum short | average grain size of | |
| | Starting Material | temperature (° C.) | pressure (GPa) | cBN (%) | hBN (%) | wBN (%) | side of tabular crystal (nm) | granular crystal (nm) | hardness (GPa) |
| Example 1 | high crystalline hBN | 1800 | 10 | 98.93 | 0.24 | 0.83 | 759 | 148 | 50 |
| Example 2 | high chrystalline hBN | 1900 | 10 | 98.84 | 0.21 | 0.95 | 1103 | 187 | 52 |
| Example 3 | high crystalline hBN | 2000 | 10 | 96.7 | 0 | 3.3 | 828 | 190 | 51 |
| Example 4 | high crystalline hBN | 2100 | 10 | 100 | 0 | 0 | 966 | 210 | 51 |
| Example 5 | high crystalline hBN | 1600 | 16.5 | 92.5 | 0 | 7.5 | 552 | 93 | 55 |
| Example 6 | high crystalline hBN | 1300 | 20 | 5.3 | 0 | 94.7 | 450 | 41 | 55 |
| Example 7 | high crystalline hBN | 2200 | 10 | 100 | 0 | 0 | 1030 | 285 | 53 |
| Comparative Example 1 | high crystalline hBN | 2300 | 7.7 | 99.93 | 0.07 | 0 | none | 332 | 45 |
| Comparative Example 2 | high crystalline hBN | 2300 | 7.7 | 99.92 | 0.08 | 0 | none | 400 | 47 |
| Comparative Example 3 | high crystalline hBN | 2300 | 10 | 100 | 0 | 0 | none | 1000~ | 47 |
| Comparative Example 4 | pBN | 2100 | 10 | 99.31 | 0 | 0.69 | none | 353 | 49 | of the circle, and the number of grain boundaries sectioned by a straight line inside the circle is counted. The average length of section is determined by dividing the length of the straight line by the sectioned number, and the average crystal grain size is obtained by multiplying the average length of section by 1.128. In addition, since the smallest average grain size in Comparative Example 4 was 1000 nm, it was not possible to use the section method.

The magnifying power for the SEM image used in the section method is 30000 times. This is because if the magnifying power is lower than the above one, the number of grains inside the circle increases, and thereby it is difficult to observe the grain boundaries, which makes it possible to miscount the number of the grain boundaries and to include the tabular structure in drawing the lines; and if the magnifying power is greater than the above one, the number of grains inside the circle becomes excessively small, and thereby it is not possible to calculate the average grain size correctly.

In the experiment, for one sample, 3 pieces of SEM images photographed at different places were used. The section method was applied to each of the SEM images, and the average grain size was calculated as an average value.

The lengths of the long side and the short side of the tabular structure were measured by using a SEM image having a magnifying power of 3000 times. The reason for performing the measurement by such magnifying power is that it is highly possible to photograph only a part of a larger tabular crystal at a magnifying power higher than 3000 times.

The Knoop hardness was measured as the hardness. A micro-Knoop indenter was used in measuring the Knoop hardness. In the measurement, the load was set to 4.9N. VLPAK 2000 manufactured by Mitutoyo Corporation was used as the measuring equipment. The measurement was performed for five times, the greatest and the smallest values were excluded and an average of the left three values was determined as the hardness of the sample.

As shown in Table 1, it was found that the polycrystal in Examples 1 to 7 contained tabular crystals (tabular cubic boron nitride 2). The maximum value of the short side of the tabular crystal (tabular cubic boron nitride 2) was 450 nm to 1103 nm, and the average grain size of the granular crystal (granular cubic boron nitride 1) was 41 to 285 nm. Moreover, it was found that the polycrystal in Examples 1 to 3, 5 and 6 contained wBN. The Knoop hardness of the polycrystal in Examples 1 to 7 was 50 to 55 GPa.

On the other hand, it was found that the polycrystal in Comparative Examples 1 to 4 did not contain tabular crystals (tabular cubic boron nitride 2) and the polycrystal in Comparative Examples 1 to 3 did not contain wBN. The average grain size of the granular crystal (granular cubic boron nitride 1) in Comparative Examples 1 to 4 was 332 nm or more, which was greater than that in Examples 1 to 7. Moreover, The Knoop hardness of the polycrystal in Comparative Examples 1 to 4 was 49 GPa or less, which was lower than that in Examples 1 to 7.

Hereinafter, an embodiment of the cutting tool will be described.

As the material of the cutting tool, the polycrystal according to Example 1, Comparative Example 1 and Comparative Example 5, respectively, was used. In Comparative Example 5, the polycrystal was a cBN sinter containing a sintering agent at 5 to 10%. Each polycrystal was processed into the shape of a cutting tip, and the cutting tip was used to perform continuous cutting on an end face of a sintered ferrous alloy D40 so as to investigate the lifetime of the cutting tip. The cutting performed was a dry type. As cutting conditions, a cutting speed V=250 m/min, a feeding rate f=0.1 mm, and a cutting depth d=0.3 mm were used.

The result showed that the cutting tool using the polycrystal of Example 1 had a lifetime 1.4 times longer than the cutting tool using the polycrystal of Comparative Example 1, and the cutting tool using the polycrystal of Example 1 had a lifetime 2 times longer than the cutting tool using the polycrystal of Comparative Example 5.

Hereinafter, an embodiment of the wire-drawing die will be described.

As the material of the wire-drawing die, the polycrystal according to Example 2 and Comparative Example 1, respectively, was used. Each polycrystal was fixed inside a round metal frame to prepare a wire-drawing die having a pore size of φ20 μm. The prepared wire-drawing die was used to perform a wire drawing on a wire rod SUS304 so as to investigate an abrasion loss of the pore (enlarged amount of the pore) of the wire-drawing die. The wire-drawing performed was a wet type. The drawing speed was set to 500 m/min, and the drawing time was set to 10 hours.

The result showed that the abrasion loss of the pore of the wire-drawing die using the polycrystal of Example 2 was 0.85 times less than that of the wire-drawing die using the polycrystal of Comparative Example 1.

Hereinafter, an embodiment of the grinding tool will be described.

As the material of the grinding tool, the polycrystal according to Example 3 and Comparative Example 2, respectively, was used. Each polycrystal was brazed to a cemented carbide shank to prepare a disc-type grinding tool having a diameter of φ3 mm and a cutting edge of angle 50°. The prepared grinding tool was used to investigate an abrasion loss of the cutting edge in forming a V-groove on the surface of the sintered ferrous alloy D40. The grinding was performed at a rotation speed of 4000 rpm/min and an incision depth of 2 μm for 1 hour.

The result showed that the abrasion loss of the cutting edge of the grinding tool using the polycrystal of Example 3 was 0.7 times less than that of the grinding tool using the polycrystal of Comparative Example 2.

(Experiment 2)

The cubic boron nitride complex polycrystal according to Examples 11 and 12 was prepared in the following manner. First, high crystalline hBN in the form of pellets, which is commercially available and has the GI index of 3.6, was used as the starting material. The starting material was placed in a capsule made of high-melting metal and held for 20 minutes under the pressure and temperature conditions listed in Table 2 by using a super HPHT generator to convert the starting material directly into cBN and wBN.

The cubic boron nitride complex polycrystal according to Examples 13 and 14 was prepared in the following manner. First, pBN was used as the starting material. The starting material was placed in a capsule made of high-melting metal and held for 20 minutes under the pressure and temperature conditions listed in Table 2 by using a super HPHT generator to convert the starting material directly into cBN and wBN. Since the peaks (100), (101) and (102) are broad and overlapped with each other, the GI index of pBN could not be calculated. However, since the X-ray diffraction intensity ratio of plane (100) to plane (002) (diffraction intensity of plane (100)/the diffraction intensity of plane (002)) of pBN is 0.016, the pBN crystals are oriented.

The cubic boron nitride complex polycrystal according to Comparative Example 11 was prepared in the following manner. First, high crystalline hBN in the form of pellets, which is commercially available and has the GI index of 3.6, was used as the starting material. The starting material was placed in a capsule made of high-melting metal and held at a temperature of 2300° C. for 15 minutes under a pressure of 7.7 GPa generated by using a belt-type high pressure generator to convert the starting material directly into cBN.

The cubic boron nitride complex polycrystal according to Comparative Example 12 was prepared in the following manner. First, pyrolytic boron nitride (pBN) was used as the starting material. The starting material was placed in a capsule made of high-melting metal and held for 20 minutes at a pressure of 10 GPa and a temperature of 2100° C. obtained by using a super HPHT generator to convert the starting material directly into cBN and wBN.

An X-ray diffraction device (X'Pert manufactured by PANalytical) was used to obtain the GI index of hBN and the orientation of pBN.

The composition, the grain size, and the hardness of each polycrystal obtained in the abovementioned manner in Examples 11 to 14 and Comparative Examples 11 and 12 were measured according to the following method.

The composition of each phase was obtained by identifying each phase through using the X-ray diffraction device (X'Pert manufactured by PANalytical). The X-ray source of the device is Cu, which emits a Kα beam having a wavelength of 1.54 Å.

The average grain size of the samples listed in Table 2 was measured by using a scanning electron microscope (ULTRA55 manufactured by Carl Zeiss company). A section method was used to obtain the average grain size. In the method, firstly, a circle is drawn on an image of the scanning electron microscope (SEM), 8 straight lines are drawn radially from the center to the outer circumference of the circle, and the number of grain boundaries sectioned by a straight line inside the circle is counted. The average length of section is determined by dividing the length of the straight line by the sectioned number, and the average crystal grain size is obtained by multiplying the average length of section by 1.128.

The magnifying power for the SEM image used in the section method is 30000 times. This is because if the magnifying power is lower than the above one, the number of grains inside the circle increases, and thereby it is difficult to observe the grain boundaries, which makes it possible to miscount the number of the grain boundaries and to include the tabular structure in drawing the lines; and if the magnifying power is greater than the above one, the number of grains inside the circle becomes excessively small, and thereby it is not possible to calculate the average grain size correctly.

In the experiment, for one sample, 3 pieces of SEM images photographed at different places were used. The section method was applied to each of the SEM images, and the average grain size was calculated as an average value.

The Knoop hardness was measured as the hardness. A micro-Knoop indenter was used in measuring the Knoop hardness. In the measurement, the load was set to 4.9N. VLPAK 2000 manufactured by Mitutoyo Corporation was used as the measuring equipment. The measurement was performed for five times, the greatest and the smallest values were excluded and an average of the left three values was determined as the hardness of the sample.

The results about the composition, the grain size and the hardness of each polycrystal in Examples 11 to 14 and Comparative Examples 11 and 12 are shown in Table 2.

TABLE 2

| | Starting Material | Synthetic Condition | | Composition | | | average grain size (nm) | Knoop hardness (GPa) |
| --- | --- | --- | --- | --- | --- | --- | --- | --- |
| | | temperature (° C.) | pressure (GPa) | cBN (%) | hBN (%) | wBN (%) | | |
| Example 11 | high crystalline hBN | 1300 | 20 | 37 | 0 | 63 | 101 | 57 |
| Example 12 | high crystalline hBN | 1500 | 16.5 | 79.5 | 0 | 20.5 | 166 | 53 |
| Example 13 | pBN | 1300 | 20 | 57 | 0 | 43 | 53 | 50 |
| Example 14 | pBN | 1700 | 13 | 89.8 | 0 | 10.2 | 87 | 51 |
| Comparative Example 11 | high crystalline hBN | 2300 | 7.7 | 99.92 | 0.08 | 0 | 400 | 45 |
| Comparative Example 12 | pBN | 2100 | 10 | 99.31 | 0 | 0.69 | 353 | 49 |

As shown in Table 2, it was found that the polycrystal in Examples 11 to 14 contained the wurtzite-type boron nitride (wBN) at 10 v/v % or more (10.2 to 63 v/v %). The average grain size in Examples 11 to 14 was 53 to 166 nm. The Knoop hardness in Examples 11 to 14 was 50 to 57 GPa.

On the other hand, the polycrystal in Comparative Example 11 did not contain the wurtzite-type boron nitride (wBN), and the polycrystal in Comparative Example 12 contained the wurtzite-type boron nitride (wBN) at a minute amount (0.69 v/v %). The average grain size in Comparative Examples 11 and 12 was 353 nm or more, which was greater than that in Examples 11 to 14. Moreover, The Knoop hardness in Comparative Examples 11 and 12 was 49 GPa or less, which was lower than that in Examples 11 to 14.

According to the experiment, it was confirmed that the polycrystal in Examples 11 to 14 had a smaller average grain size and a higher hardness than the polycrystal in Comparative Examples 11 and 12.

The embodiments and examples of the present invention have been described in the above, and various modifications may be made to the above embodiments and examples. It is intended that the scope of the present invention is not limited to the above embodiments and examples but defined by the scope of the claims and encompasses all modifications equivalent in meaning and scope to the claims.

REFERENCE SIGNS LIST

1: granular cubic boron nitride; 2: tabular cubic boron nitride; 3: short side; 4: long side; a: longer direction

The invention claimed is:

1. A cubic boron nitride complex polycrystal comprising:
   granular cubic boron nitride; and
   tabular cubic boron nitride;
   the average grain size of said granular cubic boron nitride being 500 nm or less, and
   the maximum value of a short side of said tabular cubic boron nitride being 10 nm or more to 10000 nm or less.

2. The cubic boron nitride complex polycrystal according to claim 1, wherein the average grain size of said granular cubic boron nitride is 300 nm or less.

3. The cubic boron nitride complex polycrystal according to claim 1, wherein the maximum value of said short side of said tabular cubic boron nitride is 10 nm or more to 1000 nm or less.

4. The cubic boron nitride complex polycrystal according to claim 1, further comprising wurtzite-type boron nitride and unavoidable impurities as the remainder, wherein
   the content of said wurtzite-type boron nitride is 0.1 to 95 v/v %.

5. The cubic boron nitride complex polycrystal according to claim 4, wherein said content of said wurtzite-type boron nitride is 0.1 to 10 v/v %.

6. The cubic boron nitride complex polycrystal according to claim 4, wherein the average grain size of said granular cubic boron nitride is 200 nm or less.

7. The cubic boron nitride complex polycrystal according to claim 1, further comprising wurtzite-type boron nitride, pressurized hexagonal boron nitride and unavoidable impurities as the remainder, wherein
   the content of said wurtzite-type boron nitride is 0.1 to 3 v/v %, and
   the content of said pressurized hexagonal boron nitride is 0.01 to 0.5 v/v %.

8. A cutting tool including the cubic boron nitride complex polycrystal according to claim 1.

9. A wire-drawing die including the cubic boron nitride complex polycrystal according to claim 1.

10. A grinding tool including the cubic boron nitride complex polycrystal according to claim 1.

11. The cubic boron nitride complex polycrystal according to claim 1, wherein the tabular cubic boron nitride is stacked in layers.

* * * * *